United States Patent [19]

Renoux

[11] Patent Number: 5,478,621
[45] Date of Patent: Dec. 26, 1995

[54] TOOTHED WHEEL MANUFACTURING PROCESS, AND TOOTHED WHEEL MADE THEREBY

[75] Inventor: Pascal Renoux, Chatellerault, France

[73] Assignee: Valeo Systemes d'Essuyage, Montigny-le-Bretonneux, France

[21] Appl. No.: 246,331

[22] Filed: May 19, 1994

[30] Foreign Application Priority Data

May 21, 1993 [FR] France ................... 93 06118

[51] Int. Cl.$^6$ ........................................ B32B 9/00
[52] U.S. Cl. .................. 428/66.6; 428/63; 428/66.7; 428/76; 29/451; 29/527.1; 29/527.6
[58] Field of Search .................. 428/63, 64, 65, 428/66, 76; 29/451, 527.1, 527.6

[56] References Cited

U.S. PATENT DOCUMENTS 2,938,939  5/1960  Malcolm ................ 174/68.5

FOREIGN PATENT DOCUMENTS

| 0533052 | 3/1993 | European Pat. Off. . |
| 3109500 | 10/1982 | Germany . |
| 3730900 | 3/1989 | Germany . |
| 3818563 | 12/1989 | Germany . |
| 8803356 | 5/1988 | WIPO . |

*Primary Examiner*—Patrick J. Ryan
*Assistant Examiner*—Abraham Bahta
*Attorney, Agent, or Firm*—Morgan & Finnegan

[57] ABSTRACT

The invention relates to a process for manufacturing a toothed wheel, especially for a windshield wiper control device, of the kind having on one face a conductive strip. The process consists of providing in the wheel face an impression having a shape complementing the shape of the conductive strip, disposing the conductive strip in said impression, and securing the conductive strip with the front face of the toothed wheel. The front face has a border running along a peripheral edge of the impression and protruding at the border of said impression.

6 Claims, 1 Drawing Sheet

TOOTHED WHEEL MANUFACTURING PROCESS, AND TOOTHED WHEEL MADE THEREBY

FIELD OF THE INVENTION

The present invention relates to a process for manufacturing a toothed wheel, such as for a windshield wiper control device, and to a toothed wheel obtained by the process, the wheel being of the kind having a conductive strip on its face. The process includes providing an impression in the front face of the toothed wheel, the impression having a shape complementing the shape of the conductive strip, fitting the conductive strip to the impression and securing the strip to the front face of the toothed wheel.

BACKGROUND OF THE INVENTION

In the prior art from French Patent FR-2 142 627 there is known a toothed wheel comprising a conductive strip fixed to the front face by means of lugs produced by cutting and raising of a blank. These lugs pass through the covering of the front face at the level of apertures and are bordered in the base by recesses provided in the rear face of the covering. This embodiment requires several machining and assembly operations which has an effect on the cost price.

DISCUSSION OF THE INVENTION

The object of the present invention is to remove these drawbacks by proposing a less costly manufacturing process.

For this purpose the process according to the invention includes the following steps:

Providing on the face of the toothed wheel a border peripheral to the impression and protruding at the edge of the impression; and deforming said protruding peripheral border when the conductive strip is disposed in the impression, by exerting on said protruding peripheral border a substantially radial stress directed towards the conductive strip until it covers the edge of said conductive strip.

Advantageously the peripheral border is obtained by moulding.

Preferably the face of the toothed wheel is made from a thermoplastic material, and the deformation of the peripheral edge is effected by means of a hot die exerting pressure in a radial direction on the outer edge of the peripheral border.

Preferably the hot die has a recess, the width of which substantially corresponds to the width of the peripheral border, the lateral edges of the recess being inclined in the direction of the conductive strip.

In another aspect, the invention relates to a toothed wheel obtained by using the above process, having on the face thereof a peripheral border protruding at the border of the impression, the said peripheral border covering at least one part of the peripheral edge of the conductive strip disposed in the impression.

Preferably the projection of the conductive strip in relation to the surface of the wheel is between 0.20 millimetres and −0.05 millimetres.

In a preferred refinement, an axial crown has a protruding positioning toe, the conductive strip having a complementary cutout portion.

The invention further contemplates a tool for performing the process according to the invention, the tool being formed by a hot die comprising at least one recess having a trapezoidal section, in which:

the dimension of the large base is greater than the width of the border, the dimension of the small base at the bottom of the recess is less than the width of the border, the height is less than or equal to the height of the border.

The invention will be better understood by reading the following description of preferred embodiments of the invention which follows, and which is given by way of example only, and with reference to the accompanying drawings.

DESCRIPTION OF PREFERRED EMBODIMENTS OF THIS INVENTION

Figure 1:
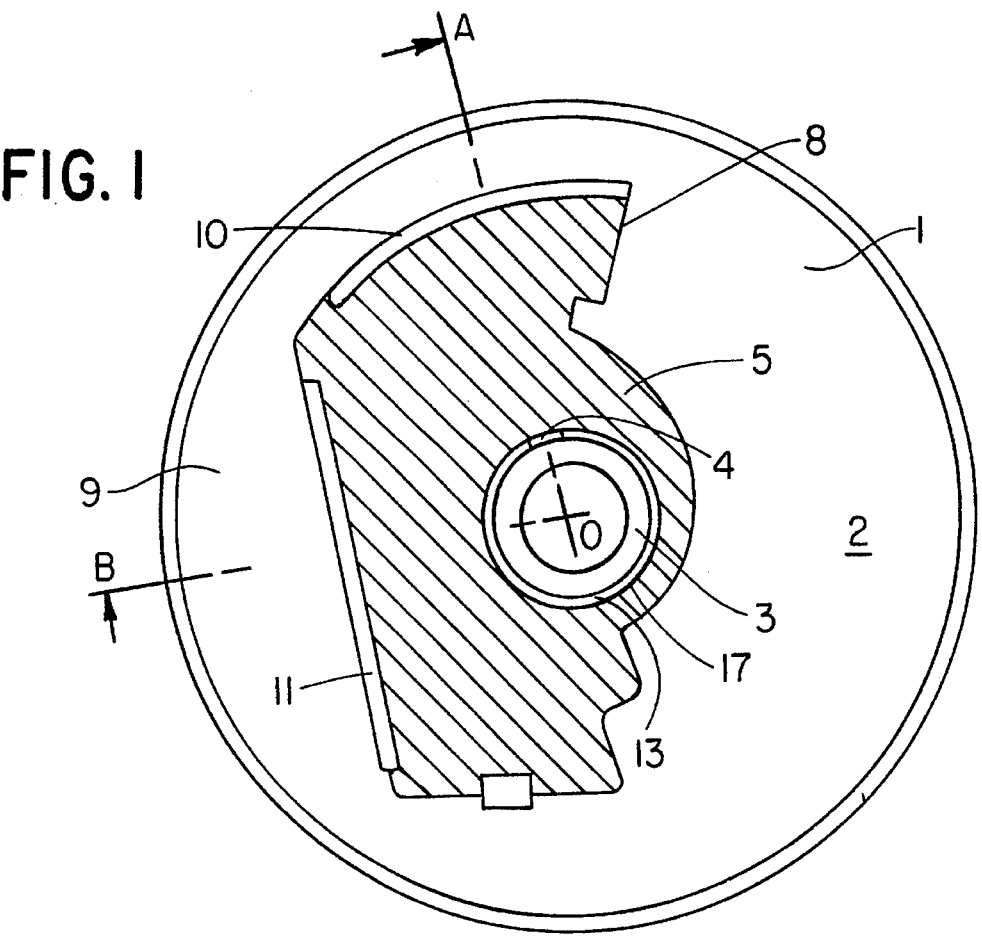
FIG. 1 is a plan view of a toothed wheel.

FIG. 1 represents a front view of the toothed wheel according to the invention produced by injection of plastics material. It has an axial crown 3 protruding in relation to a front surface 2. This axial crown 3 has a toe 4 extending radially whilst also protruding in relation to the front surface 2.

A conductive strip 5 is fixed onto the front face. The shape of the conductive strip is formed by annular sectors, the angular length of which is determined by the information which will be supplied by a brush unit (not shown) in electrical contact with said conductive strip.

The conductive strip is made by cutting a metal sheet. A central hole is provided to allow the passage of the axial crown 3 and of the toe 4. The asymmetry of the central hole ensures the angular positioning of the strip on the front surface, the toe 4 performing a locating function.

The front face has an impression 6 having a shape complementing the conductive strip 5. This impression, shown in section on FIGS. 2 and 3, has a depth determined so that the conductive strip 5, when it is in position, is flush with the surface of the front face 2, i.e. that the plane of the surface 7 is substantially coplanar with the plane of surfaces 8, 9 of the parts of the front face in the extension of the conductive strip 5. The distance between these two planes is between −0.05 and +0.20 millimeters.

The front face has, on the periphery of the conductive strip, borders 10, 11 protruding in relation to the surface of the front face. The section along a cutting plane containing the axis of the toothed wheel, of these border segments 10, 11, before the assembly of the conductive strip, is substantially rectangular, as represented on FIG. 2. A lateral edge 12 of the closest border of the conductive strip is substantially perpendicular to the upper surface 8 of the front face, so as to allow the positioning of the conductive strip.

Figure 2:
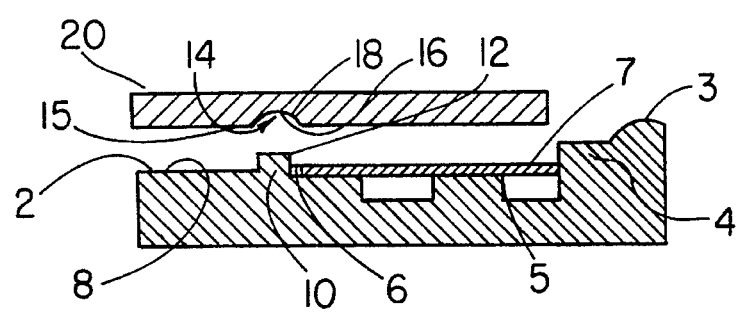
FIG. 2 is a sectional view along line OA in FIG. 1 before compression of the peripheral border, and a sectional view of a die.

When the conductive strip 5 is positioned in the impression 6, the borders 10, 11 are deformed by means of a hot die 20 having a recess 14 adapted to mould the shapes of the borders 10, 11. FIG. 2 shows a sectional view of such a die 20.

The recess is delimited by a first inclined outer lateral face 15 and an opposite lateral face 18 inclined in the opposite direction, the two lateral faces being joined at a base 16 and thus forming a substantially trapezoidal profile. The section of the recess 14 corresponds to a trapezium, the surface of which is substantially equal to the surface of the corresponding section of the border 10, and in which:

the dimension of the large base is greater than the width of the border 10, the dimension of the small base at the bottom of the recess 14 is less than the width of the border 10, the height is less than or equal to the height of the border 10.

After the application of the hot die 20, the section of the borders 10, 11 assumes a trapezoidal shape projecting over the conductive strip 5. The projecting part 21 fixes the conductive strip 5 at the bottom of the impression 6.

In the example shown in FIG. 1, the crown 3 has on its periphery a border in the shape of a projection 13 rising above the surface 8, 9 of the front face 2. The edge 17 of this projection is, before the introduction of the conductive strip 5, substantially perpendicular to the upper surface 8 of the front face 2.

Figure 3:
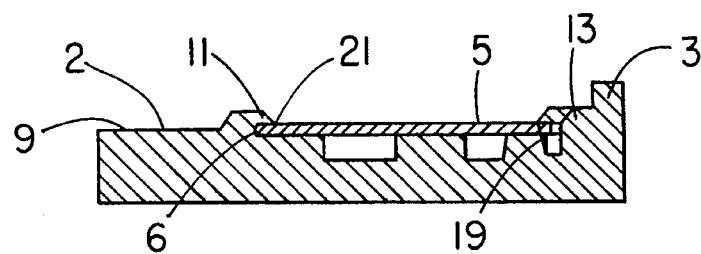
FIG. 3 is a sectional view along line OB in FIG. 1, after compression of the peripheral border.

When the conductive strip 5 is positioned in the impression 6, the projection 13 is deformed by beading with the result that it comes to cover the inner edge 19 of the said conductive strip, as can better be seen in FIG. 3.

Thus the conductive strip 5 is retained, at its external periphery, by borders 10 and 11 and on its internal periphery, by the projection 13 surrounding the crown 3.

Of course, the projection 13 may extend circumferentially, either partially or completely, around the crown 3.

The invention is described above in a non-restrictive manner. It is obvious that the person skilled in the art will be able to make various modifications without for all that departing from the scope of the invention. In particular, the number, shape and position of the borders may be subject to various modifications.

What we claim is:

1. A toothed wheel suitable for a windscreen wiper control device, comprising on one face a generally flat conductive strip having inner and outer peripheries, said face defining an impression having a shape complementing the flat shape of the conductive strip for receiving therein the conductive strip, said face further defining a border peripheral to the conductive strip and protruding from said impression in a direction that is generally perpendicular to the flat conductive strip, said peripheral border covering at least a portion of the peripheral edge of the conductive strip disposed in the impression whereby the conductive strip is secured to said face of the toothed wheel.

2. A toothed wheel according to claim 1, wherein a portion of the border is situated in the vicinity of the outer periphery of the conductive strip.

3. A toothed wheel according to claim 1, wherein a portion of the border is situated in the vicinity of the inner periphery of the conductive strip.

4. A toothed wheel according to claim 1, wherein the conductive strip projects in relation to the surface of the wheel between +0.20 millimeters and −0.05 millimeters.

5. A toothed wheel according to claim 1, wherein said face has a protruding axial crown, the conductive strip having a cutout portion having a complementary section in which the inner periphery is formed.

6. A toothed wheel according to claim 5, wherein the axial crown has a protruding positioning toe, the conductive strip having a complementary cutout portion for positioning thereby.

* * * * *